BIDIRECTIONAL BINARY RATE MULTIPLIER

Filed Nov. 25, 1966 3 Sheets-Sheet 1

INVENTOR
WILLIAM G. BATTE

BY William H. King

ATTORNEYS

Oct. 21, 1969 W. G. BATTE 3,474,236

BIDIRECTIONAL BINARY RATE MULTIPLIER

Filed Nov. 25, 1966 3 Sheets-Sheet 2

INVENTOR
WILLIAM G. BATTE

BY

William H. King
ATTORNEYS

BIDIRECTIONAL BINARY RATE MULTIPLIER

INVENTOR
WILLIAM G. BATTE

BY

Hm. E. Coy
William H. King
ATTORNEYS

United States Patent Office 3,474,236
Patented Oct. 21, 1969

3,474,236
BIDIRECTIONAL BINARY RATE MULTIPLIER

William G. Batte, 146 Westbrook Drive,
Hampton, Va. 23366

Filed Nov. 25, 1966, Ser. No. 597,143
Int. Cl. G06f 15/20, 7/38
U.S. Cl. 235—150.3 5 Claims

ABSTRACT OF THE DISCLOSURE

A binary rate multiplier that will operate bidirectionally. The multiplier has two inputs: an X input consisting of X input pulses and voltage levels indicating whether these input pulses are forward or backward direction pulses, and a binary coded Y input. From these two inputs the multiplier produces XY output pulses with voltage levels indicating whether the output pulses are forward or backward direction pulses.

Origin of the invention

The invention described herein was made by an employee of the United States Government and may be manufactured or used by or for the Government for government purposes without the payment of any royalties thereon or therefor.

Specification

The invention relates generally to a binary rate multiplier and more specifically concerns a bidirectional binary rate multiplier.

The undirectional binary rate multiplier has been in existence for several years. For most applications it is adequate; however, for some applications this type of binary rate multiplier is inadequate. For these applications a bidirectional type binary rate multiplier is needed. To the inventor's knowledge there is not a bidirectional binary rate multiplier in existence.

It is therefore an object of this invention to provide a bidirectional binary rate multiplier.

Another object of this invention is to modify the unidirectional type binary rate multiplier so that is will operate bidirectionally.

Other objects and advantages of this invention will further become apparent hereinafter and in the drawings, in which.

Figure 1:
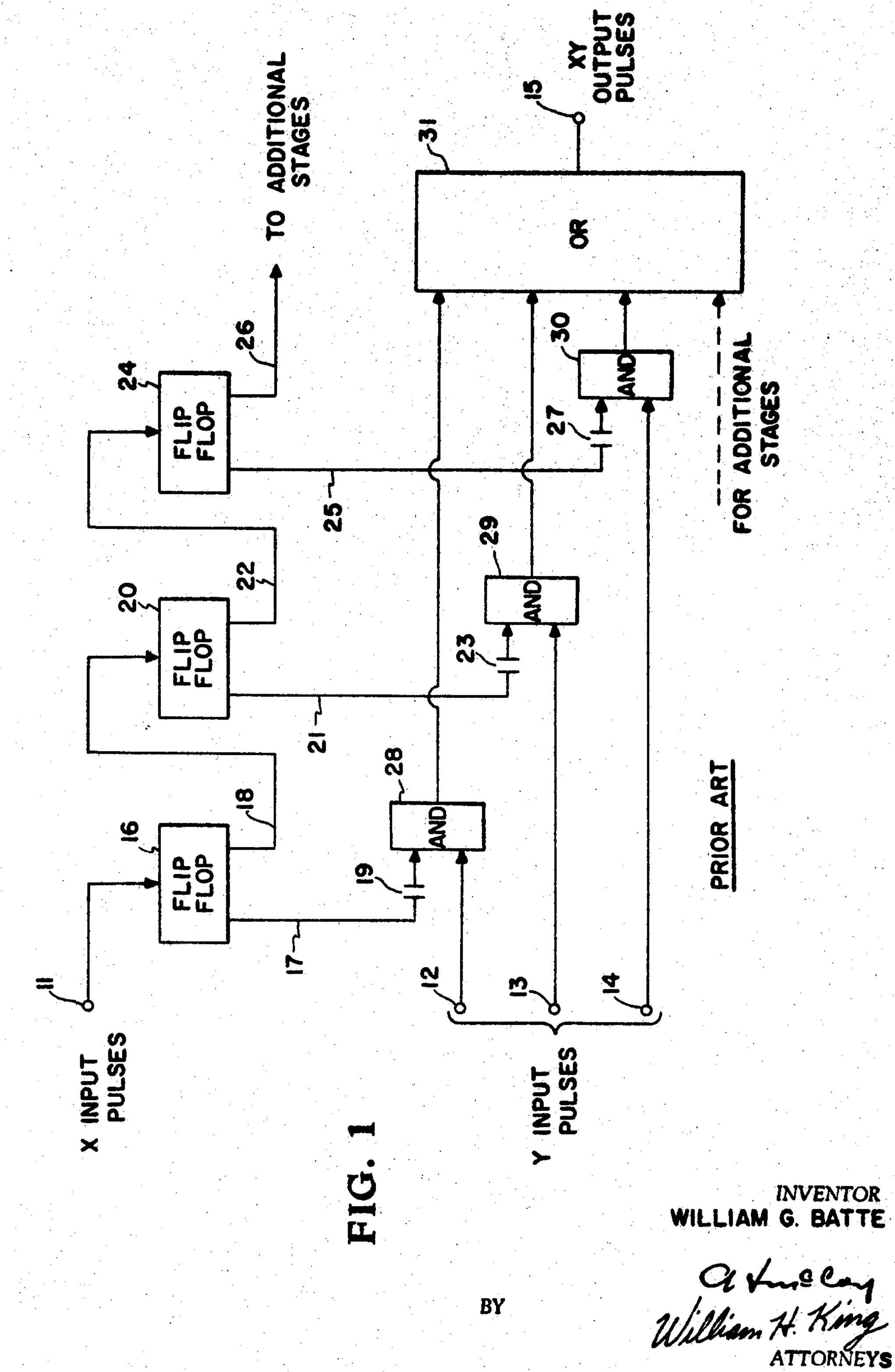
FIG. 1 is a block diagram of a conventional unidirectional type binary rate multiplier.

In describing the embodiment of the invention illustrated in the drawings, specific terminology will be resorted to for the sake of clarity. However, it is not intended to be limited to the specific term so selected, and it is to be understood that each specific term includes all technical equivalents which operate in a similar manner to accomplish a similar purpose.

Turning now to FIG. 1, a brief description of a conventional unidirectional binary rate multiplier will be given. The purpose of the binary rate multiplier is to generate pulses, at output terminal 15, the number of which equals the product XY, where X is the number of input pulses applied to input terminal 11 and Y is the number represented by the binary coded input to terminals 12, 13 and 14. The X input pulses at terminal 11 are applied to the trigger (complementary) input of a conventional flip flop 16. Flip flop 16 has two outputs 17 and 18. Outputs 17 and 18 are the conventional set and reset outputs, respectively. Output 18 provides the carry signal required in the conventional asynchronous counter; and output 17 with a capacitor 19 provide a pulse input to an AND gate 28 each time flip flop 16 is turned on (set). Output 18 is applied to a flip flop 20 which has set and reset outputs, 21 and 22, respectively. Set output 21 with a capacitor 23 provides a pulse input to an AND gate 29 each time flip flop 20 is turned on. Reset output 22 is applied to a flip flop 24 which has set and reset outputs, 25 and 26, respectively. Set output 25 with a capacitor 27 provide a pulse input to an AND gate 30 each time flip flop 24 is turned on. Reset output 26 is applied to the flip flop in the next stage if additional stages are used. Only three stages of this binary rate multiplier are shown, but it is understood that any number of stages can be used. As is well known in the art, the pulses produced by capacitor 19 are equal to X divided by 2, the pulses produced by capacitor 23 are equal to X divided by 4, and the pulses produced by capacitor 27 are equal to X divided by 8. Capacitor 19 and input terminal 12 are connected to an AND gate 28; capacitor 23 and input terminal 13 are connected to an AND gate 29; and capacitor 27 and input terminal 14 are connected to an AND gate 30. The outputs of gates 28, 29 and 30 are connected to an OR gate 31 which produces the XY output pulses at output terminal 15. In the operation of the binary rate multiplier in FIG. 1, when X input pulses are applied to input terminal 11, X divided by 2 pulses are applied to gate 28, X divided by 4 pulses are applied to gate 29 and X divided by 8 pulses are applied to gate 30. If it is desired to multiply these X input pulses by a binary number such as $.101_2$, then true inputs are applied to input terminals 12 and 14 and a false input is applied to input terminal 13. Hence, X divided by 2 pulses pass through gate 28, and X divided by 8 pulses pass through gate 30. These pulses are summed by gate 31 to produce $.101_2$ X pulses or ⅝ X pulses at terminal 15. The Y input can assume any value in the interval $0 \leq Y < 1$ in steps of ⅛. If additional stages are added then the magnitude of these steps can be decreased. As is well known in the prior art, the pulses at the outputs of gates 28, 29 and 30 will never coincide since they are taken from the outputs of the flip flops opposite the carry outputs.

It will now be explained why the conventional type of unidirectional binary rate multiplier as disclosed in FIG. 1 is inadequate for some applications. For example, consider the application depicted by FIG. 2. In this example block 41 represents a source of bidirectional binary pulses. Source 41 includes two outputs 42 and 43. Output 42 is a train of pulses and output 43 indicates whether these pulses on output 42 are either forward direction or backward direction pulses. For the purpose of this disclosure a forward (backward) direction pulse is defined as a pulse which would cause a bidirectional counter to increase (decrease) by one count. Output 43 can be in either of two states (i.e., voltage levels): forward direction or backward direction. For one voltage level the pulses at output 42 are in the forward direction and for the other voltage level the pulses at the output 42 are in the backward direction. These two outputs, 42 and 43, are applied to a bidirectional binary counter 44. Bidirectional binary counters are conventional and well known. Output 42 is also applied to a binary rate multiplier 45 which multiplies the pulses applied to it by some value K. The output of multiplier 45 is applied to a bidirectional binary counter 46. Since a conventional unidirectional binary rate multiplier such as the one shown in FIG. 1 does not provide an input for directional signals, the output 43 from source 41 is applied directly to bidirectional binary counter 46.

Figure 2:
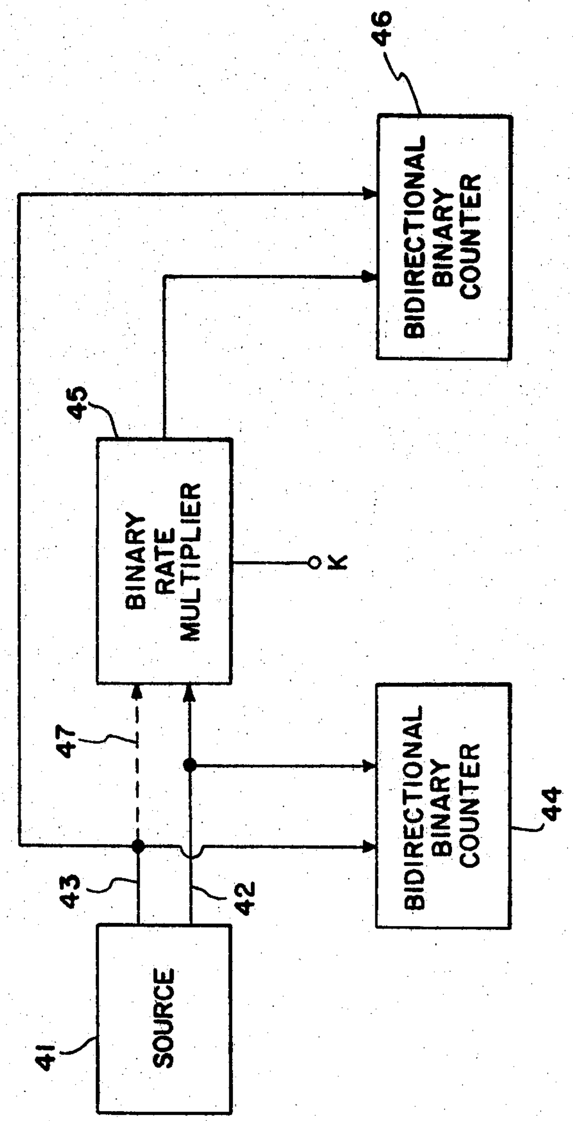
FIG. 2 is a block diagram for the purpose of demonstrating the inadequacy of a conventional unidirectional binary rate multiplier for some applications.

In the setup in FIG. 2 bidirectional binary counter 44 counts all the pulses produced by source 41 and the bidirectional binary counter 46 should count K times the pulses produced by source 41. For some applications the setup in FIG. 2 is adequate. For example, if all the pulses from source 41 are either forward direction pulses or backward direction pulses, then obviously counter 44 would count all these pulses and counter 46 would count K times these pulses. However, there are many applications in which the setup in FIG. 2 is inadequate. For example, if source 41 is alternately generating a forward direction pulse and a backward direction pulse, then counter 44 will always register either 0 or 1. However, for K equal to ½, the binary rate multiplier 45 "passes" alternate pulses and the operation of counter 46 is monotonic. Hence, the quantities in counters 44 and 46 are not related by the factor K.

Figure 3:
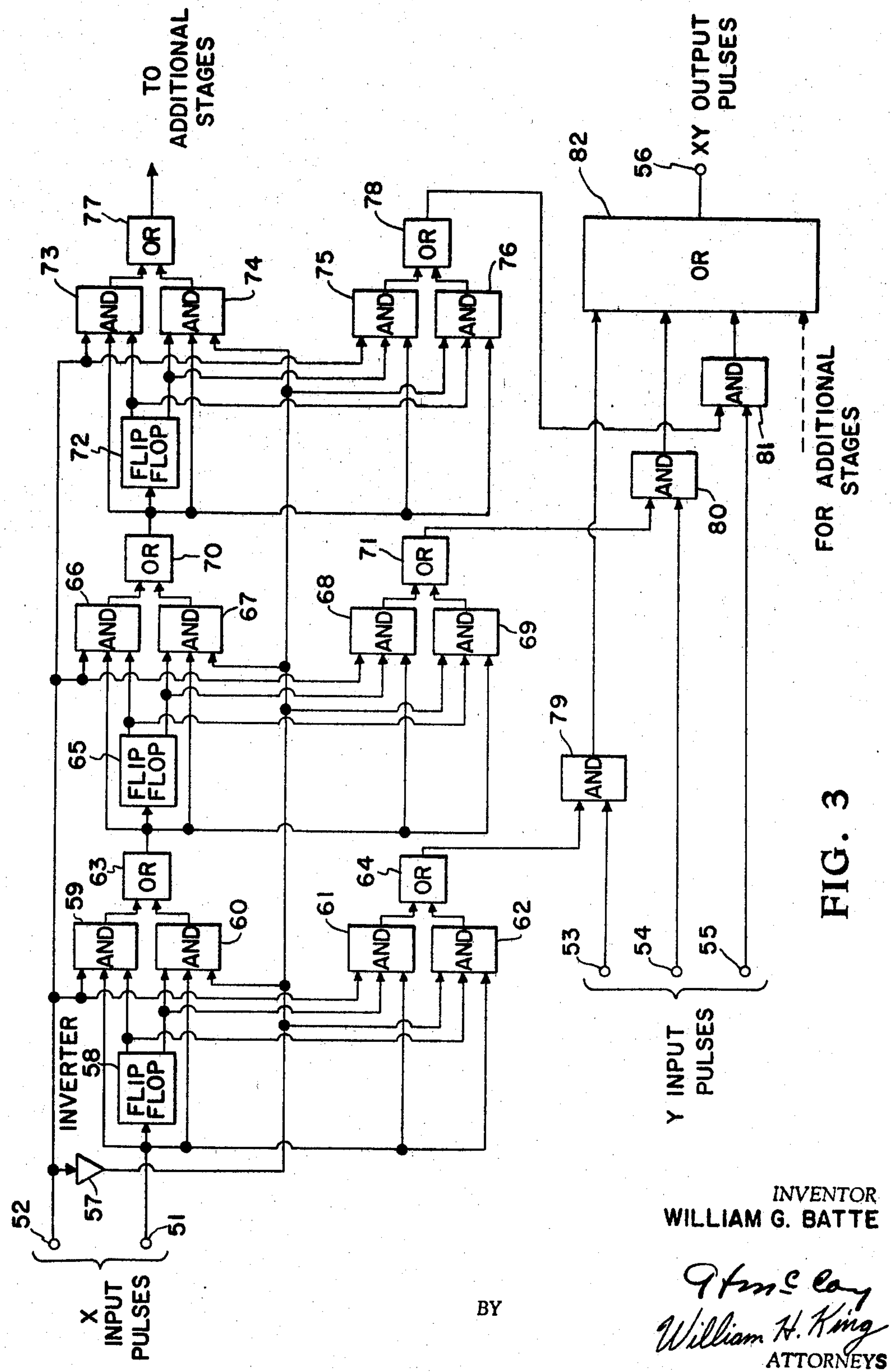
FIG. 3 is a block diagram of this invention.

It is the purpose of this invention to modify the conventional unidirectional binary rate multiplier so that it will operate bidirectionally. Then a directional input, shown by the dotted line 47, can be applied to the input of multiplier 45 in the setup in FIG. 2. To make the unidirectional binary rate multiplier in FIG. 1 bidirectional, all that is necessary is to let the multiplier operate as shown if the input pulses are in the forward direction and to interchange the two outputs of each of the flip flops 16, 20, and 24 if the input pulses are in the backward direction. That is, if the input pulses are in the backward direction, outputs 17 and 18 should be interchanged, outputs 21 and 22 should be interchanged and outputs 25 and 26 should be interchanged. In this way output 17 would be applied to flip flop 20 and output 18 would be applied to gate 28; output 21 would be applied to flip flop 24 and output 22 would be applied to gate 29; and output 26 would be applied to gate 30 and output 25 would be applied to the flip flop in the next stage. The embodiment of the invention shown in FIG. 3 is one means of accomplishing this function. However, it must be understood that there are many alternative ways in which this switching function could be performed without departing from the spirit or scope of this invention.

The block diagram in FIG. 3 is one possible embodiment of the present invention. The X input is applied to input terminals 51 and 52. The input to terminal 51 is the pulses and the input to terminal 52 is the voltage level indicating whether these pulses are in the forward direction or in the backward direction. The Y input is applied as a binary code to input terminals 53, 54 and 55. The output is the XY pulses produced at output terminal 56 and the voltage levels at terminal 52.

The input at terminal 52 is applied to an inverter 57 which changes the voltage level to the alternative level. The pulses at input terminal 51 are applied to a flip flop 58, an AND gate 59, an AND gate 60, an AND gate 61, and an AND gate 62. The input at terminal 52 is applied to inverter 57, gate 59 and gate 61; and the output of inverter 57 is applied to gate 60 and gate 62. One of the outputs of flip flop 58 is applied to gate 59 and to gate 62; and the other output of flip flop 58 is applied to gate 60 and to gate 61. The outputs of gates 59 and 60 are applied to an OR gate 63, and the outputs of gates 61 and 62 are applied to an OR gate 64. The output of gate 63 is applied to a flip flop 65, an AND gate 66, an AND gate 67, an AND gate 68, and an AND gate 69. Input 52 is applied to gate 66 and gate 68; and the output of inverter 57 is applied to gate 67 and gate 69. One of the outputs of flip flop 65 is applied to gates 66 and 69 and the other output of flip flop 65 is applied to gates 67 and 68. The outputs of gates 66 and 67 are applied to an OR gate 70, and the outputs of gates 68 and 69 are applied to an OR gate 71. The output of gate 70 is applied to a flip flop 72, an AND gate 73, an AND gate 74, an AND gate 75, and an AND gate 76. Input 52 is applied to gates 73 and 75, and the output of inverter 57 is applied to gates 74 and 76. One of the outputs of flip flop 72 is applied to gates 73 and 76, and the other output of flip flop 72 is applied to gates 74 and 75. The outputs of gates 73 and 74 are applied to an OR gate 77; and the outputs of gates 75 and 76 are applied to an OR gate 78. The output of gate 77 is applied to additional stages of binary rate multiplier. The output of gate 64 and input 53 are applied to an AND gate 79; the output of gate 71 and input 54 are applied to an AND gate 80; and the output of gate 78 and input 55 are applied to an AND gate 81. The outputs of gates 79, 80 and 81 are applied to an OR gate 82 to produce the output at output terminal 56.

To show that the outputs of the flip flops in each stage are interchanged when different level inputs appear on input terminal 52, consider only the two outputs of flip flop 58. Assume that there is a voltage level at input terminal 52 indicating that the input consists of forward direction pulses. Then the upper output of flip flop 58 is applied through gate 59 and gate 63 to flip flop 65; and the lower output of flip flop 58 is applied through gate 61 and gate 64 to gate 79. Hence, when a forward voltage level is at input terminal 52 the upper output of flip flop 58 is the carry output and the lower output of flip flop 58 is the usable output for that particular stage. Now consider the case when the voltage level at input terminal 52 indicates that the input consists of backward direction pulses. Then this voltage level at input terminal 52 is inverted to the other level by inverter 57. Hence, the upper output of flip flop 58 is applied through gate 62 and gate 64 to gate 79; and the lower output of flip flop 58 is applied through gate 60 and gate 63 to the input of flip flop 65. Therefore, the two outputs of flip flop 58 are interchanged when different levels appear at input terminal 52.

To show that the binary rate multiplier in FIG. 3 operates bidirectionally, let it be used as the binary rate multiplier 45 in FIG. 2. Then output 43 from source 41 is connected through line 47 to terminal 52 in FIG. 3 and output 42 is connected to terminal 51. Now assume as before that source 41 alternately produces forward and backward direction pulses and assume that K is equal to ½. Then as was discussed before, bidirectional binary counter 44 will oscillate between 0 and 1. Since K is equal to ½ a true signal is applied to terminal 53 and false signals are applied to terminals 54 and 55. Suppose the first pulse at input terminal 51 is a forward direction pulse, then a pulse will be produced at output terminal 56 and this in combination with the voltage level at input terminal 52 will indicate that this is a forward direction output pulse. When the next pulse is received at input terminal 51 the voltage level at input terminal 52 will be at the other level. This pulse at input terminal 51 will produce another pulse at output terminal 56 which in combination with the voltage level at input terminal 52 will indicate a negative direction pulse. The next pulse at input terminal 51 will produce a pulse of output terminal 56 which in combination with the voltage level at input terminal 52 will indicate a forward direction pulse, and so on. Hence, it can be seen that if the output terminal 56 and the voltage levels at input terminal 52 are connected to bidirectional binary counter 46 in FIG. 2, the operation of the counter will no longer be monotonic. Other examples can be checked to verify that the count registered on counter 46 will always be approximately K times as great as the count registered on counter 44 when the multiplier in FIG. 3 is used as multiplier 45 in FIG. 2.

It is to be understood that the form of the invention herewith shown and described is to be taken as only one possible embodiment of the invention. Various changes may be made in the shapes, size and arrangements of parts. For example, equivalent elements may be substituted for those illustrated and described herein, parts may be reversed, and certain features of the invention may be utilized independently of the use of other features, all without departing from the spirit or scope of the invention as defined in the subjoined claims. It should be noted that the logic circuitry associated with each flip flop produces the two functions $AB+A\overline{B}$ and $A\overline{B}+\overline{A}B$, where A is one output of the flip flop, $\overline{A}$ is the other output of the flip flop, B is the input at terminal 52 and $\overline{B}$ is the output of inverter 57. Hence, any logic circuitry that will generate these functions could be substituted for that shown without departing from this invention.

What is claimed is:

1. A bidirectional binary rate multiplier with a first input for receiving input pulses and a second input for indicating the directions of said input pulses comprising: a series of flip flops with each flip flop having an input and first and second outputs with the said input pulses applied to the input of the first flip flop of said series and with the first output of each of said flip flops in said series connected to the input of the next succeeding flip flop in said series; means for producing a pulse each time said second output changes voltage levels; means for summing said pulses produced at the second outputs of said flip flops in accordance with a selected number; and means for interchanging the first and second outputs of said flip flops in accordance with said second input whereby the summed pulses are the output pulses of said multiplier and said second input indicates the directions of said summed pulses.

2. A bidirectional binary rate multiplier according to claim 1 wherein said means for interchanging the first and second outputs of said flip flops includes means for inverting said second input and logic circuit means associated with each of said flip flops receiving said second input, said inverted input, the input from said flip flop and the two outputs from said flip flop for connecting said first output of the flip flop to the input of the next flip flop and connecting said second output of the flip flop to said summing means when said second input indicates forward direction pulses and for connecting said second output of the flip flop to the input of the next flip flop and connecting said first output of the flip flop to said summing means when said second input indicates backward direction pulses.

3. A bidirectional binary rate multiplier according to claim 2 wherein said logic circuit means generates the functions $AB+\overline{A}\overline{B}$ and $A\overline{B}+\overline{A}B$ where A is said first output of a flip flop, $\overline{A}$ is said second output of a flip flop, B is said second input and $\overline{B}$ is the output from said inverter.

4. A bidirectional binary rate multiplier with a first input for receiving input pulses and a second input B for indicating the directions of said input pulses comprising: a series of flip flops with each flip flop having an input, a first output A and a second output $\overline{A}$; means for inverting said second input B to produce $\overline{B}$; logic circuit means associated with each flip flop in said series for receiving A, $\overline{A}$, B and $\overline{B}$, and generating the functions $AB+\overline{A}\overline{B}$ and $A\overline{B}+\overline{A}B$; means for connecting the said first input to the input of the first flip flop in said series and for connecting said generated function $AB+\overline{A}\overline{B}$ in each stage to the input of the flip flop in the next succeeding stage; and means for selecting certain of the $A\overline{B}+\overline{A}B$ functions in accordance with a binary number and summing these selected functions whereby said summed functions is a series of output pulses equal to said input pulses times said binary number and said second input B indicates the directions of said output pulses.

5. In a binary rate multiplier of the type in which a series of flip flops are utilized wherein the input pulses are applied to the input of the first flip flop in said series, a first output of each of the flip flops is connected to the input of the next succeeding flip flop in said series and the second outputs from said flip flops are combined in accordance with a binary number to form a series of output pulses equal to said input pulses times said binary number; a voltage input the level of which indicates whether each of said input pulses is a forward direction pulse or a backward direction pulse; and means for connecting said first output of each of said flip flops to the input of the next succeeding flip flop and said second output to said combining means when said voltage input level indicates forward direction pulses, and for connecting said second output of each of said flip flops to the input of the next succeeding flip flop and said first output to said combining means when said voltage input level indicates backward direction pulses whereby the binary rate multiplier operates bidirectionally.

References Cited

UNITED STATES PATENTS

| | | | |
|---|---|---|---|
| 3,126,476 | 3/1964 | Pariser et al. | 235—164 |
| 3,408,644 | 10/1968 | Kintner | 235—150.3 |

OTHER REFERENCES

Digital Computer Design Fundamentals, Copyright 1962 by McGraw-Hill Book Co., pp. 432 to 434 relied on.

MALCOLM A. MORRISON, Primary Examiner

JOSEPH E. RUGGIERO, Assistant Examiner

U.S. Cl. X.R.

235—164